Dec. 6, 1949  H. S. JACOBS ET AL  2,490,629
REVERSIBLE POLARITY GENERATOR
Filed March 13, 1948  3 Sheets-Sheet 1
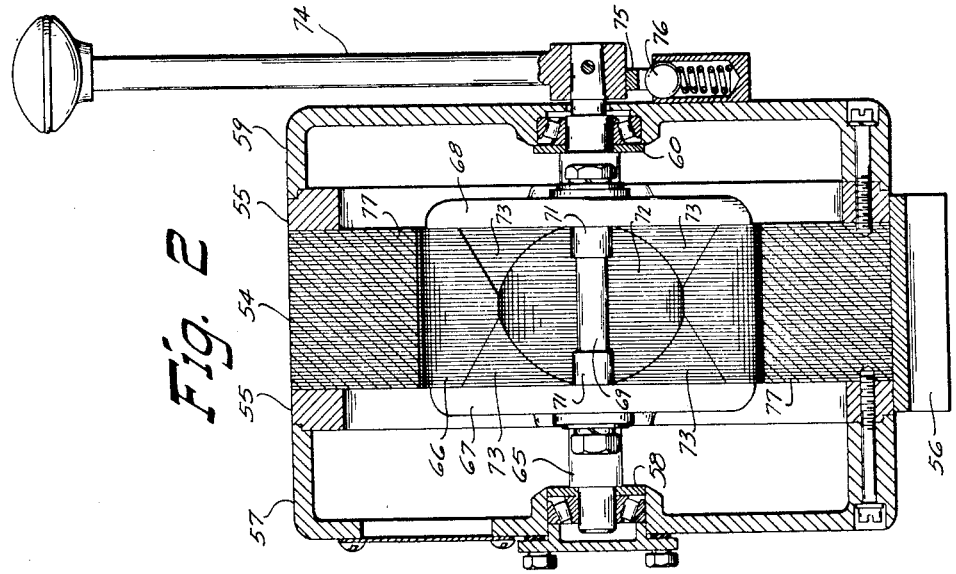
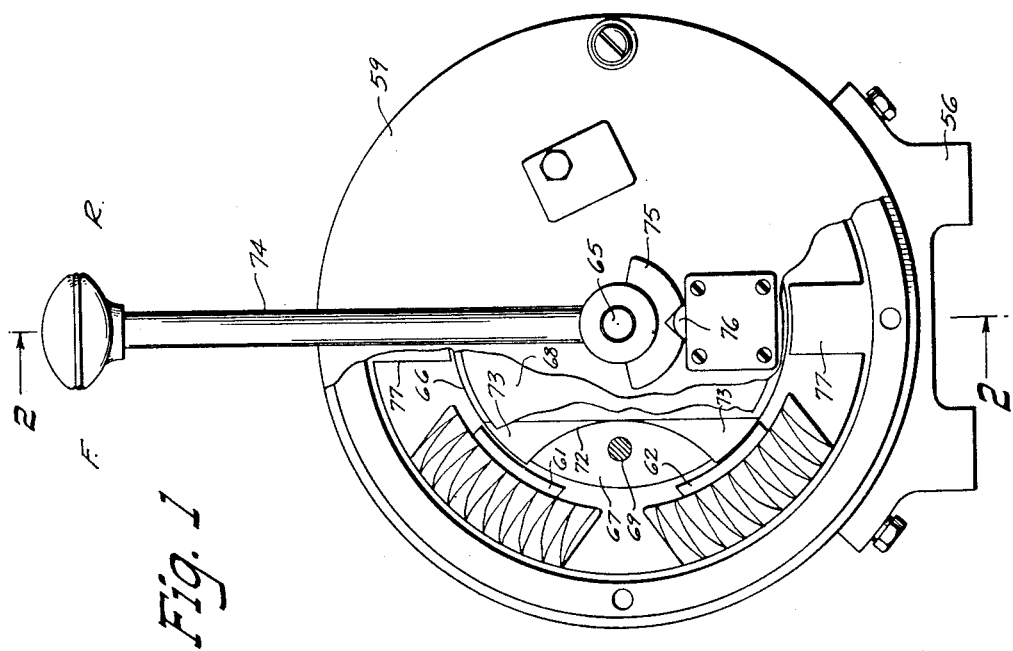
Inventors
Henry S. Jacobs
By William J. Chrones
David A. Fox
Attorney

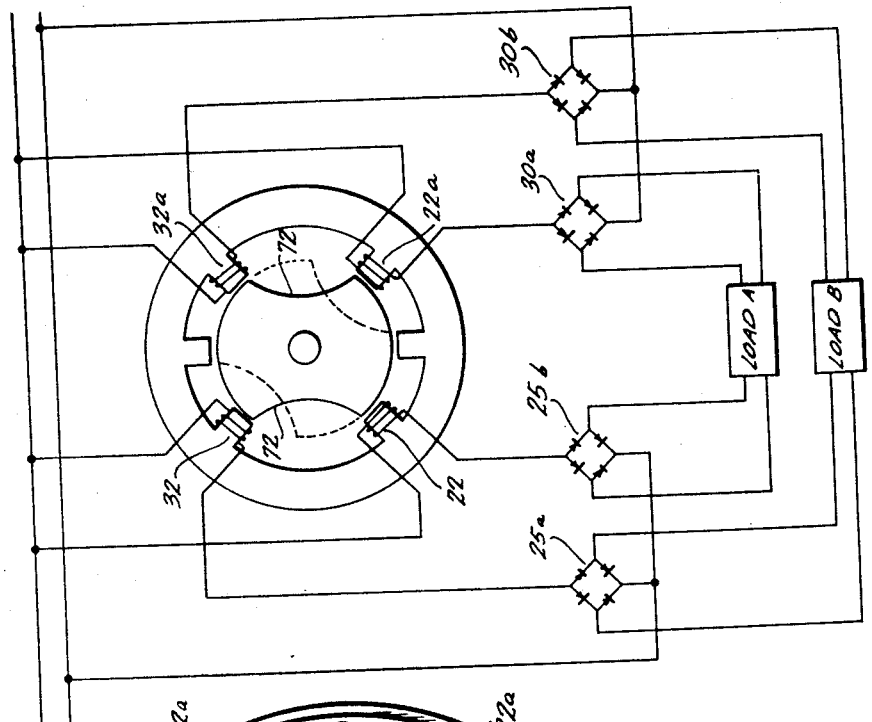
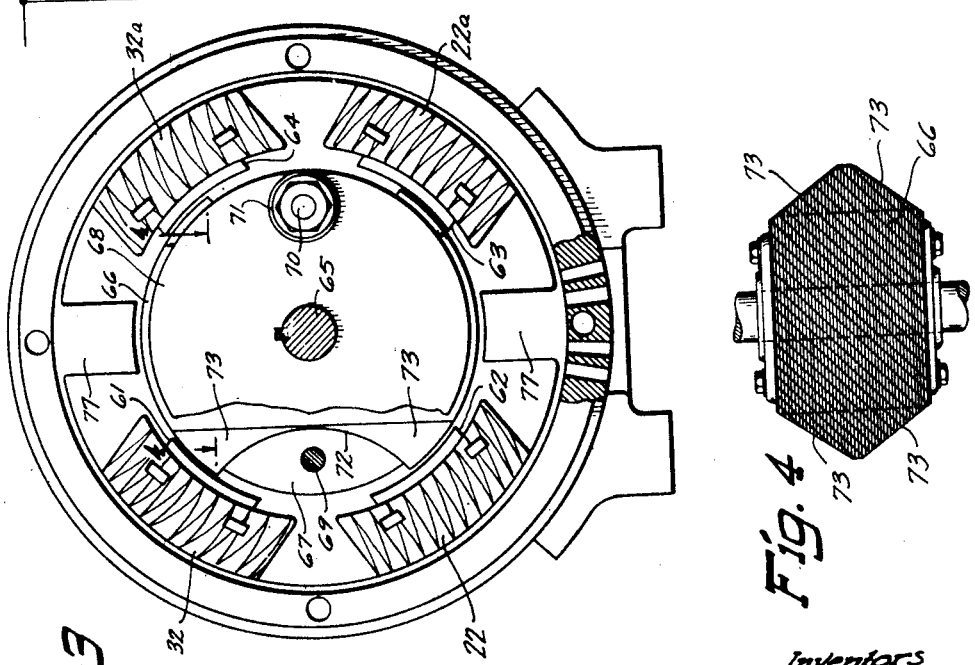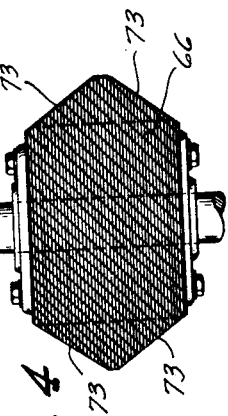

Dec. 6, 1949  H. S. JACOBS ET AL  2,490,629
REVERSIBLE POLARITY GENERATOR
Filed March 13, 1948   3 Sheets-Sheet 3
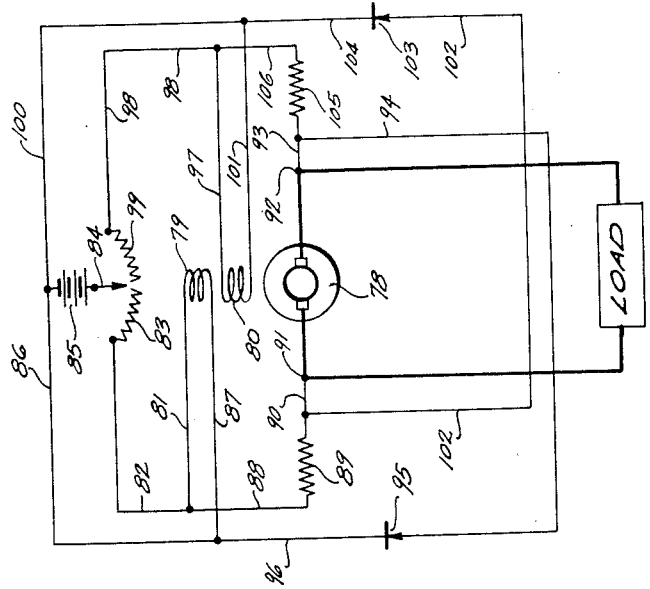
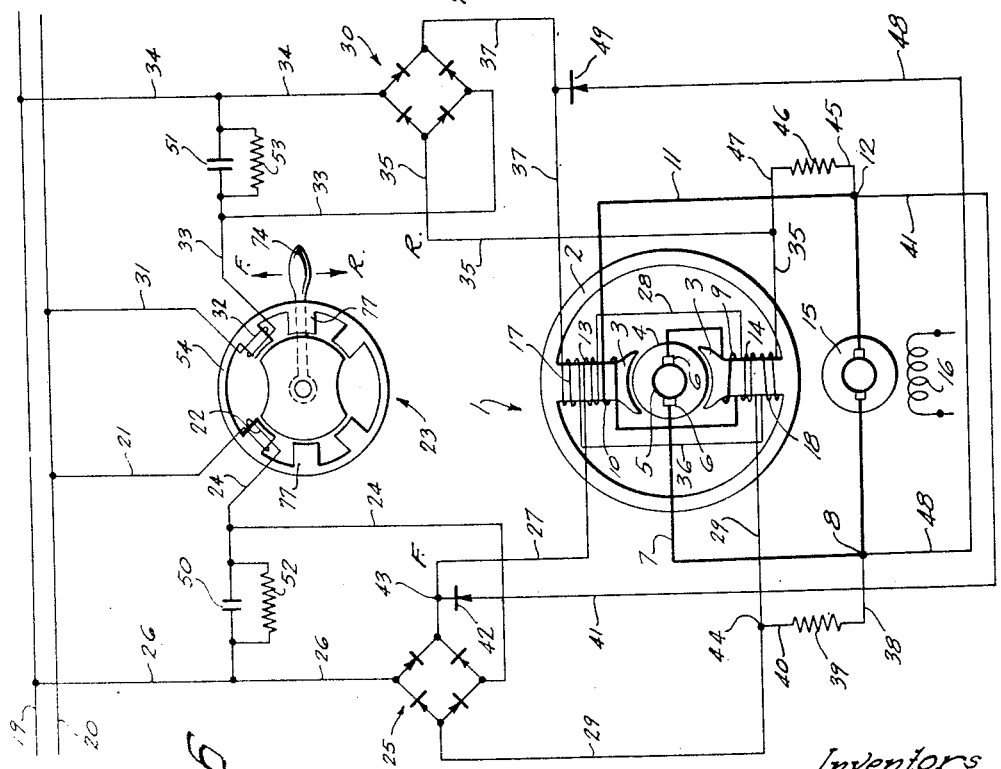

Patented Dec. 6, 1949

2,490,629

UNITED STATES PATENT OFFICE 2,490,629

REVERSIBLE POLARITY GENERATOR

Henry S. Jacobs and William J. Cherones, Milwaukee, Wis., assignors to Harnischfeger Corporation, Milwaukee, Wis., a corporation of Wisconsin Application March 13, 1948, Serial No. 14,686

6 Claims. (Cl. 322—6)

This invention relates to reversible polarity direct current generators of the type commonly employed for electro-mechanical power transmitters in which a motor of the separately excited type is directly connected to the terminals of the generator so that speed and direction of rotation of the motor may be controlled by regulation of comparatively moderate field currents of the generator. More specifically, the invention resides in an improved generator of the type above mentioned in which separate forward and reverse field windings are employed, each of said windings being arranged for independent excitation by independent adjustable excitation current sources and each of said windings also being arranged for supplementary self-excitation derived from the generator armature through blocking rectifier means which discriminate on the basis of polarity of generator output in such manner as to supplement the excitation only of that winding which is being excited by said independent excitation sources, such supplementary excitation current being so limited as to amount that the same is insufficient to maintain magnetization of the generator field in the absence of said independent excitation whereby the polarity and output of the generator remains at all times subject to the command of the adjustable independent excitation sources.

One object of this invention is to provide an improved generator of the type above defined in which field windings active at any one time are more simple in design and construction and, for a given capacity, of reduced self-inductance so as to provide a generator which responds more rapidly to sudden variations of load.

Another object is to provide a generator of the character described in which the field currents required to be regulated in order to regulate the output of the generator are moderate in amount and capable of being regulated by simple and reliable apparatus which if desired may be so constructed as to be free of dependence upon switches or other movable contacts.

Another object of this invention is to provide a generator of the character described wherein smoother and more rapid acceleration of a load energized thereby may be obtained with diminished commutating difficulties.

Another object is to provide a generator of the character described which will operate with reduced electrical and mechanical shock to itself and a load driven thereby both during rapid alteration of load and during plugging reversal.

The above and other objects and advantages of this invention will become apparent from the description which follows. This invention is herein described by reference to the accompanying drawings, forming a part hereof, in which there is set forth by way of illustration and not of limitation, specific forms in which apparatus may be constructed in accordance therewith.

In the drawings:

Fig. 1 is a front view in elevation with parts broken away of a variable impedance controller of a type which may be used in conjunction with this invention.

Fig. 2 is a side view in section of the controller 15 shown in Fig. 1;

Fig. 3 is a front view in elevation of the controller shown in Fig. 1 with the cover removed and certain parts broken away;

Fig. 4 is a detail top plan view in section viewed through the plane 4—4 indicated in Fig. 3;

Fig. 5 is a diagrammatic showing of a circuit showing the controller depicted in Fig. 1 employed for regulating two separate generators or loads;

Fig. 6 is a diagrammatic showing of one form of the circuit of this invention employing a controller of the type shown in Fig. 1 to control a generator, and Fig. 7 is a diagrammatic showing of another form of the circuit of this invention employing an adjustable rheostat for controlling a generator.

As appears in Fig. 6 of the drawings, an apparatus in accordance with this invention may be constructed by providing a generator designated generally by the numeral 1 having a field frame 2 in which a plurality of pole pieces 3 are mounted. Arranged for rotation within the field frame 2 is an armature 4 having a commutator 5 engaged by brushes 6. Armature current is carried from the brushes 6 on one hand through lead 7 to terminal 8 and on the other hand through series field windings 9 and 10 and lead 11 to terminal 12. The armature 4 is arranged to be driven by any suitable outside source of mechanical power.

Also mounted upon the pole pieces 3 are forward field windings 13 and 14. The windings 13 and 14 are designated forward field windings in order to signify that excitation thereof results in the appearance at the generator terminals 8 and 12 of an output of such polarity as to cause a motor 15 connected thereto to rotate in a forward direction. Motor 15 is provided with a separately excited field 16 so that the direction of rotation of said motor is determined by the polarity of current furnished through terminals 8 and 12. Windings 13 and 14 are in a sense both separately excited windings and shunt windings for reasons hereinafter more fully explained.

Also mounted upon the pole pieces 3 are reverse field windings 17 and 18 similar to the windings 13 and 14 with the exception that the same when excited cause appearance of an output at the generator terminal of such polarity as to cause reverse rotation of motor 15.

For the purpose of supplying a part of the excitation current for the forward field windings 13 and 14 a source of supply of alternating current comprising supply leads 19 and 20 is provided. Connected with lead 20 by means of lead 21 is a winding 22 of an impedance controller 23 which will be described in greater detail hereinafter. Extending from winding 22 is a lead 24 which joins with one input terminal of a full-wave dry-disc rectifier 25. The other input terminal of rectifier 25 is connected by means of lead 26 with supply lead 19 as shown.

One output terminal of the rectifier 25 is connected by means of lead 27 with winding 13 which is joined in turn by lead 28 with winding 14 which in turn is connected by lead 29 with the other output terminal of rectifier 25. The rectified output of rectifier 25 is thus caused to flow in windings 13 and 14 whenever current is supplied to the input terminals of rectifier 25. In a manner to be more fully described hereinafter impedance controller 23 may be adjusted to supply alternating current to the rectifier 25 in amounts ranging from approximately zero up to a predetermined maximum.

In manner similar to that described above the input terminals of rectifier 30 are connected by means of lead 31, winding 32 of impedance controller 23, lead 33 and lead 34 with supply leads 19 and 20. One output terminal of rectifier 30 is connected through lead 35 to winding 18 which is joined in turn through lead 36 with winding 17 which is connected in turn through lead 37 with the other output terminal of rectifier 30.

The polarity of the output of rectifier 25 and the direction of winding of windings 13 and 14 is such as to produce forward rotation of motor 15 as previously described when impedance controller 23 is adjusted to supply current to rectifier 25. In similar manner when impedance controller 23 is adjusted to supply current to rectifier 30 current flows in the windings 17 and 18 in such direction as to cause reverse rotation of motor 15.

For the purpose of supplementing excitation of windings 13 and 14, by the rectifier 25, terminal 8 of the generator is connected through lead 38, resistor 39 and lead 40 with lead 29. Terminal 12 of the generator, on the other hand, is connected through lead 41 and blocking rectifier 42 with lead 27. By reason of this arrangement when controller 23 is adjusted to supply current to rectifier 25, windings 13 and 14 become excited by the output of rectifier 25 and the output voltage of generator 1, appearing at the terminals 8 and 12, rises and as soon as this output voltage exceeds the potential difference prevailing at junctions 43 and 44 current begins to pass through the blocking rectifier 42 supplementing the excitation of windings 13 and 14. As the output potential of generator 1 continues to rise the supplementary excitation derived from the generator 1 increases in amount and this process continues until the sharing of the excitation load reaches a steady state determined by the comparative effective resistances of the rectifier excitation source on the one hand and the generator armature excitation source on the other hand.

The effective resistance of the rectifier excitation source is determined by the inherent characteristics of the rectifier 25 and its supply circuit and in most cases is substantial in amount. In order to render the effective resistance of the generator armature circuit comparable so that a desirable proportioning between independent excitation and self-excitation shall prevail, the resistor 39 is provided. In most instances it will be desirable that the output of generator 1 and hence control over the motor 15 be completely at the command of the controller 23. To accomplish this, the resistance value of resistor 39 is so chosen that when no excitation current is provided by the rectifier 25, self-excitation current furnished by the generator 1 itself is insufficient to maintain magnetization of the generator field frame 2. When these conditions are fulfilled adjustment of the controller 23 to reduce the supply of current to rectifier 25 to a point approximating zero is followed by a collapsing of the field of the generator 1 and stoppage of the motor 15.

In similar manner output of generator 1 is arranged to supply supplementary excitation to the reverse windings 17 and 18. This is accomplished by the circuit formed by lead 45 which joins with terminal 12 of generator 1 and which is connected through resistor 46 and lead 47 with lead 35 and by lead 48 which joins with terminal 8 of generator 1 and establishes connection through rectifier 49 with lead 37. The furnishing of this self-excitation circuit for windings 17 and 18 is comparable in all respects with that which supplies supplementary excitation to windings 13 and 14 as described above.

To improve the wave form of current supplied to rectifier 25, a condenser 50 is connected as shown between leads 24 and 26 and in similar fashion and for the same purpose a condenser 51 is connected between leads 33 and 34. A discharge resistor for protection of condenser 50 and rectifier 25 is connected as shown at 52 and a similar resistor for protection of condenser 51 and rectifier 30 is connected as shown at 53.

Impedance controller 23 may be constructed in any desired manner such, for example, as the specific illustrative form of the same set forth in Figs. 1 to 5 of the drawings. In the form of controller shown in the drawings a laminated stator ring 54 is mounted between clamping rings 55—55 and held on a supporting base 56. Secured to one of the clamping rings 55 is a rear bell housing 57 having a shaft supporting bearing 58 at its center. Secured to the other clamping ring 55 is a front bell housing 59 having at its center a shaft supporting bearing 60.

Integrally formed with the stator ring 54 are inwardly extending pole pieces 61, 62, 63 and 64, the same terminating on the surface of an imaginary cylinder centered about the centers of bearings 58 and 60. Mounted upon pole piece 62 is winding 22 above described. In similar fashion winding 32 above described is mounted as shown upon pole piece 61. Pole pieces 63 and 64 carry windings 22a and 32a which may be employed, if desired, for simultaneous action similar to that of windings 22 and 32, or may be connected in series therewith to augment the effect thereof.

Mounted for rotation in the bearings 58 and 60, upon shaft 65, is a laminated rotor 66 made up of laminations as shown, clamped between end plates 67 and 68 by means of bolts 69 and 70.

Bolts 69 and 70 are insulated from the end plates 67 and 68 by means of bushings 71 to minimize currents which might otherwise result due to transformer action.

The laminated rotor 66 is cut away on opposite sides with semi-circular concavities 72 as appears more clearly in Fig. 5. The laminated rotor 66 is also cut away as shown in Fig. 4 to form the bevelled faces 73 adjacent the cusps formed by the concavities 72. In this way the cylindrical outer surface of the rotor 66 is divided into 2 hexagonal faces one of which reaches to a point beneath pole piece 61 and the other of which reaches to a point beneath pole piece 62.

The shaft 65 extends outwardly from the front bell housing 59 where it is engaged by an operating handle 74. Secured to the operating handle 74 is a detent sector 75 having a notch positioned to be engaged by spring pressed ball 76 when the controller handle 74 is in mid position.

In addition to the pole pieces 61 to 64, inclusive, a more complete return flux path may be provided, if desired, by means of pole pieces 77—77, but their presence is not essential to the operation of the apparatus. Also, to reduce the effort required to move the controller handle 74 interpoles may be inserted between the windings 32 and 22 and between the windings 32a and 22a and provided with interpole windings which are continuously excited.

In operation, with the controller in the position shown in the drawings a flux path is provided in the case of winding 22 through the pole piece 61, the rotor 66, the supplementary pole 77 and the field ring 54. By reason of this magnetic circuit, the impedance of winding 32 is high and when contained in a circuit as shown in Fig. 6 will pass little current on this account. The same is true of winding 22. Upon movement of the controller handle 74 in a clockwise direction rotor 66 begins to move from beneath the end of pole piece 61 and to more completely occupy the area beneath the pole piece 62. As this motion takes place the impedance of winding 32 diminishes while that of winding 22 is maintained or even to some small extent increased. When the controller handle 74 is moved in a counter-clockwise direction the opposite effect occurs and the impedance of winding 22 diminishes while that of winding 32 is maintained. By reason of the regulating action thus produced control of generator I is accomplished without resort to any switches or any movable contacts. Where heavy duty electro-mechanical drives are employed, a control system which is free of the maintenance difficulties usually attendant upon switching or sliding contact apparatus is thus avoided.

As explained above, windings 32a and 22a may be employed to supplement the effect of windings 32 and 22 or as appears in Fig. 5 they may be employed to simultaneously regulate the output of separate generators. In the case of generators of larger size or of a type employing more than 2 pole pieces the field windings may be subdivided and separately handled as separate loads as indicated by load A and load B in Fig. 5.

The generator of this invention may also be constructed when of lower capacity and smaller size so as to be operated by the simplified circuit appearing in Fig. 7. In Fig. 7 a generator 78 is shown provided with a forward field winding 79 and a separate reverse field winding 80. Field winding 79 is connected by lead 81 and lead 82 with a variable resistance element 83.

A movable contact 84 arranged to engage the element 83 is connected in turn to a separate direct current excitation source 85. The source 85 is joined on the other hand by leads 86 and 87 with the winding 79.

The forward field winding 79 is also connected through lead 81, lead 88, resistor 89 and lead 90 with terminal 91 of generator 78. The opposite terminal 92 of generator 78 is connected through lead 93, lead 94, blocking rectifier 95, lead 96 and lead 87 to the opposite side of forward field winding 79. Thus upon movement of contact 84 into engagement with resistance element 83, forward field winding 79 becomes first independently excited from a source 85, and then both independently and self-excited as the output of generator 78 builds up. Movement of contact 84 to the mid position or off position due to the action of resistance 89 causes the generator 78 to drop its load. The polarity of the output of generator 78 may be reversed in like fashion through the action of reverse field winding 80 which is connected by lead 97 and lead 98 with resistance element 99 which may be connected in turn with the source 85 by movement of contact 84. The source 85 is connected on the other hand through lead 100 and lead 101 with the opposite side of reverse field winding 80. Supplementary excitation of reverse field winding 80 is provided through lead 102 which connects through lead 90 with terminal 91 of generator 78 and joins with field winding 80 through blocking rectifier 103, lead 104 and lead 101. The opposite terminal 92 of generator 78 is joined through lead 93, resistance element 105, lead 106 and lead 97 with the opposite side of reverse field 80.

The behavior of the circuit shown in Fig. 7 is comparable with that of the circuit illustrated in Fig. 6 except that operation depends upon the movable contact 84.

In a generator constructed in accordance with this invention each field winding performs the functions of both a self-excited field winding and a separately excited field winding. Because of this dual function the effective overall field turns and self-inductance of the generator is less than in the case of a generator of equivalent capacity in which separate, self-excited and independently excited windings are employed. The field structure of the generator of this invention, therefore, will respond more rapidly to sudden variations of load. With this improved response of the generator field, the intensity and extent of sudden surges of armature current, due to sudden load changes, is substantially reduced. This materially improves commutation and reduces mechanical shock during transient conditions.

As compared with a generator having a single field winding the generator of this invention will operate with a higher maximum voltage, will produce a smoother acceleration of the motor driven thereby and on plugging reversal will respond with substantially less interchange current between the motor and generator. On this account less commutation difficulty, less mechanical shock and less heating of the motor and the generator will occur on plugging.

The presence in the field circuits of the generator of this invention of the rectifiers which are employed, provides a low resistance discharge path for the field windings when the controller is brought suddenly to the off position. Where such discharge is aggravated as would occur if the generator field were disconnected for any reason when the controller is in the full on position the resistors 52 and 53 will act as an emergency protective device.

We claim:

1. The combination with a direct current generator having a field frame, an armature including a commutator mounted for rotation in said field frame, brushes engaging said commutator, and terminals connected to said brushes; of a forward field winding mounted in said field frame; a reverse field winding separate from said forward field winding mounted in said field frame; an independent source of excitation current for each of said forward and reverse field windings; connections forming a circuit between said generator terminals and said forward field winding in shunt relationship to its independent source of excitation, said circuit including a blocking rectifier; and connections forming a circuit between said generator terminals and said reverse field winding in shunt relationship to its independent source of excitation, said circuit including a blocking rectifier.

2. The combination with a direct current generator having a field frame, an armature including a commutator mounted for rotation in said field frame, brushes engaging said commutator, and terminals connected to said brushes; of a forward field winding mounted in said field frame; a reverse field winding separate from said forward field winding mounted in said field frame; an independent source of excitation current for said forward and reverse field windings including an independent forward excitation means adapted to be adjusted to provide a current path joining said independent excitation current source with said forward field winding for establishing a field current therein of such polarity as to cause a forward output of predetermined polarity to appear at said generator terminals, and an independent reverse excitation means adapted to be adjusted to provide a current path joining said independent excitation current source with said reverse field winding when said independent forward excitation means are inactive for establishing a field current in said reverse field winding of such polarity as to cause a reverse output of predetermined polarity opposite to that of said forward output to appear at said generator terminals; connections forming a circuit between said generator terminals and said forward field winding, said circuit including unidirectionally conducting means disposed to pass current only when of like polarity to that supplied to said forward field winding by said independent excitation source, said circuit also including current limiting means adapted to limit field excitation supplied by said armature to said forward field winding to a value insufficient to maintain magnetization of said field in the absence of excitation supplied by said independent excitation source; and connections forming a circuit between said generator terminals and said reverse field winding, said circuit including unidirectionally conducting means disposed to pass current only when of like polarity to that supplied to said reverse field winding by said independent excitation source, said circuit also including current limiting means adapted to limit field excitation supplied by said armature to said reverse field winding to a value insufficient to maintain magnetization of said field in the absence of excitation supplied by said independent excitation source.

3. The combination with a direct current generator having a field frame, a series field winding in said field frame, an armature including a commutator mounted for rotation in said field frame, brushes engaging said commutator, and terminals connected to said brushes; of a forward field winding mounted in said field frame; a reverse field winding separate from said forward field winding mounted in said field frame; an independent source of excitation current for said forward and reverse field windings; including an independent forward excitation means adapted to be adjusted to provide a current path joining said independent excitation current source with said forward field winding for establishing a field current therein of such polarity as to cause a forward output of predetermined polarity to appear at said generator terminals, and an independent reverse excitation means adapted to be adjusted to provide a current path joining said independent excitation current source with said reverse field winding when said independent forward excitation means are inactive for establishing a field current in said reverse field winding of such polarity as to cause a reverse output of predetermined polarity opposite to that of said forward output to appear at said generator terminals; connections forming a circuit between said generator terminals and said forward field winding, said circuit including unidirectionally conducting means disposed to pass current only when of like polarity to that supplied to said forward field winding by said independent excitation source, said circuit also including current limiting resistance means adapted to limit field excitation supplied by said armature to said forward field winding to a value insufficient to maintain magnetization of said field in the absence of excitation supplied by said independent excitation source regardless of the action of said series field winding; and connections forming a circuit between said generator terminals and said reverse field winding, said circuit including unidirectionally conducting means disposed to pass current only when of like polarity to that supplied to said reverse field winding by said independent excitation source, said circuit also including current limiting resistance means adapted to limit field excitation supplied by said armature to said reverse field winding to a value insufficient to maintain magnetization of said field in the absence of excitation supplied by said independent excitation source regardless of the action of said series field winding.

4. The combination with a direct current generator having a field frame, an armature including a commutator mounted for rotation in said field frame, brushes engaging said commutator, and terminals connected to said brushes; of a forward field winding mounted in said field frame; a reverse field winding separate from said forward field winding mounted in said field frame; an independent source of excitation current for said forward field winding comprising a rectifier adapted to be connected to a source of alternating current, a forward adjustable impedance means in circuit with said rectifier adapted to adjust the flow of alternating current thereto, and circuit connections joining the output of said rectifier to said forward field winding for establishing a field current therein of such polarity as to cause a forward output of predetermined polarity to appear at said generator terminals; an independent source of excitation current for said reverse field winding comprising a rectifier adapted to be connected to a source of alternating current, a reverse adjustable impedance means in circuit with said rectifier adapted to adjust the flow of alternating current thereto, and circuit connections joining the output of said rectifier to said reverse field winding for establishing a field current therein of such polarity as to cause a reverse output of predetermined polarity opposite to that of said forward output to appear at said generator terminals; connections forming a circuit between said generator terminals and said forward field winding said circuit including blocking rectifier means disposed to pass current only when of like polarity to that supplied to said forward field winding by said independent excitation source, said circuit also including current limiting means adapted to limit field excitation supplied by said armature to said forward field winding to a value insufficient to maintain magnetization of said field in the absence of excitation supplied by said independent excitation source; and connections forming a circuit between said generator terminals and said reverse field winding, said circuit including blocking rectifier means disposed to pass current only when of like polarity to that supplied to said reverse field winding by said independent excitation source, said circuit also including current limiting means adapted to limit field excitation supplied by said armature to said reverse field winding to a value insufficient to maintain magnetization of said field in the absence of excitation supplied by said independent excitation source.

5. The combination with a direct current generator having a field frame, an armature including a commutator mounted for rotation in said field frame, brushes engaging said commutator, and terminals connected to said brushes; of a forward field winding mounted in said field frame; a reverse field winding separate from said forward field winding mounted in said field frame; an independent source of excitation current for said forward field winding comprising a rectifier adapted to be connected to a source of alternating current, a forward adjustable impedance means in circuit with said rectifier adapted to adjust the flow of alternating current thereto, and circuit connections joining the output of said rectifier to said forward field winding for establishing a field current therein of such polarity as to cause a forward output of predetermined polarity to appear at said generator terminals; an independent source of excitation current for said reverse field winding comprising a rectifier adapted to be connected to a source of alternating current, a reverse adjustable impedance means in circuit with said rectifier adapted to adjust the flow of alternating current thereto, and circuit connections joining the output of said rectifier to said reverse field winding for establishing a field current therein of such polarity as to cause a reverse output of predetermined polarity opposite to that of said forward output to appear at said generator terminals; interlocking means cooperatively engaging said forward and reverse adjustable impedance means adapted to correlate adjustment thereof to cause the impedance of either of the same to be at a maximum whenever the impedance of the other is adjusted to a value less than maximum, connections forming a circuit between said generator terminals and said forward field winding said circuit including unidirectionally conducting means disposed to pass current only when of like polarity to that supplied to said forward field winding by said independent excitation source, said circuit also including current limiting resistance means adapted to limit field excitation supplied by said armature to said forward field winding to a value insufficient to maintain magnetization of said field in the absence of excitation supplied by said independent excitation source; and connections forming a circuit between said generator terminals and said reverse field winding, said circuit including unidirectionally conducting means disposed to pass current only when of like polarity to that supplied to said reverse field winding by said independent excitation source, said circuit also including current limiting resistance means adapted to limit field excitation supplied by said armature to said reverse field winding to a value insufficient to maintain magnetization of said field in the absence of excitation supplied by said independent excitation source.

6. The combination with a direct current generator having a field frame, an armature including a commutator mounted for rotation in said field frame, brushes engaging said commutator, and terminals connected to said brushes; of a forward field winding mounted in said field frame; a reverse field winding separate from said forward field winding mounted in said field frame; an impedance controller having a forward impedance winding, a reverse impedance winding, a magnetic frame, and an adjustably movable magnetic member adapted to be moved to selectively diminish the impedances of said forward and reverse impedance windings; means including a rectifier in circuit with said forward impedance winding adapted to be connected to a source of alternating current and connected to said forward field winding to supply independent direct excitation current thereto in amount determined by the position of adjustment of said impedance controller for establishing a field current in said forward field winding of such polarity as to cause a forward output of predetermined polarity to appear at said generator terminals; means including a second rectifier in circuit with said reverse impedance winding adapted to be connected to a source of alternating current and connected to said reverse field winding to supply independent direct excitation current thereto in amount determined by the position of adjustment of said impedance controller for establishing a field current in said reverse field winding of such polarity as to cause a reverse output of predetermined polarity opposite to that of said forward output to appear at said generator terminals; connections forming a circuit between said generator terminals and said forward field winding said circuit including unidirectionally conducting means disposed to pass current only when of like polarity to that supplied to said forward field winding by said independent excitation source, said circuit also including current limiting resistance means adapted to limit field excitation supplied by said armature to said forward field winding to a value insufficient to maintain magnetization of said field in the absence of excitation supplied by said independent excitation source; and connections forming a circuit between said generator terminals and said reverse field winding, said circuit including unidirectionally conducting means disposed to pass current only when of like polarity to that supplied to said reverse field winding by said independent excitation source, said circuit also including current limiting resistance means adapted to limit field excitation supplied by said armature to said reverse field winding to a value insufficient to maintain magnetization of said field in the absence of excitation supplied by said independent excitation source.

HENRY S. JACOBS.
WILLIAM J. CHERONES.

REFERENCES CITED

The following references are of record in the file of this patent:

UNITED STATES PATENTS

| Number | Name | Date |
|---|---|---|
| 1,998,209 | Sundhaussen | Apr. 16, 1935 |
| 2,287,835 | Satterlee | June 30, 1942 |